Sept. 3, 1929.　　　V. P. WENDLE　　　1,727,087
LOCK COVER FOR PAILS
Filed May 3, 1928　　　2 Sheets-Sheet 1

Inventor
Virgil P. Wendle
By Harry Frease
Attorney

Sept. 3, 1929.  V. P. WENDLE  1,727,087
LOCK COVER FOR PAILS
Filed May 3, 1928  2 Sheets-Sheet 2

Inventor
Virgil P. Wendle
By Harry Frease
Attorney

Patented Sept. 3, 1929.

1,727,087

UNITED STATES PATENT OFFICE.

VIRGIL P. WENDLE, OF DOVER, OHIO, ASSIGNOR TO THE REEVES MANUFACTURING COMPANY, OF DOVER, OHIO, A CORPORATION OF OHIO.

LOCK COVER FOR PAILS.

Application filed May 3, 1928. Serial No. 274,789.

The invention relates to covers for pails, cans and the like, and more particularly to a cover arranged to be locked upon a garbage can by means of the handle bail.

The object of the improvement is to provide a simple and efficient means upon the cover. adapted to cooperate with the usual handle bail, whereby the cover may be locked upon a garbage pail or the like, by merely raising the bail to substantially vertical position, in order to prevent dogs or other animals from dislodging the cover and removing the contents of the pail.

The above and other objects may be attained by providing a corrugated bead around the lower end of the perpiheral flange usually formed upon covers of this character, the handle bail upon the pail or can being arranged to frictionally engage said corrugated bead when raised to substantially vertical position, whereby the cover will be retained in position and locked against displacement, upon the pail.

An embodiment of the invention is illustrated in the accompanying drawings, in which—

Figure 1:
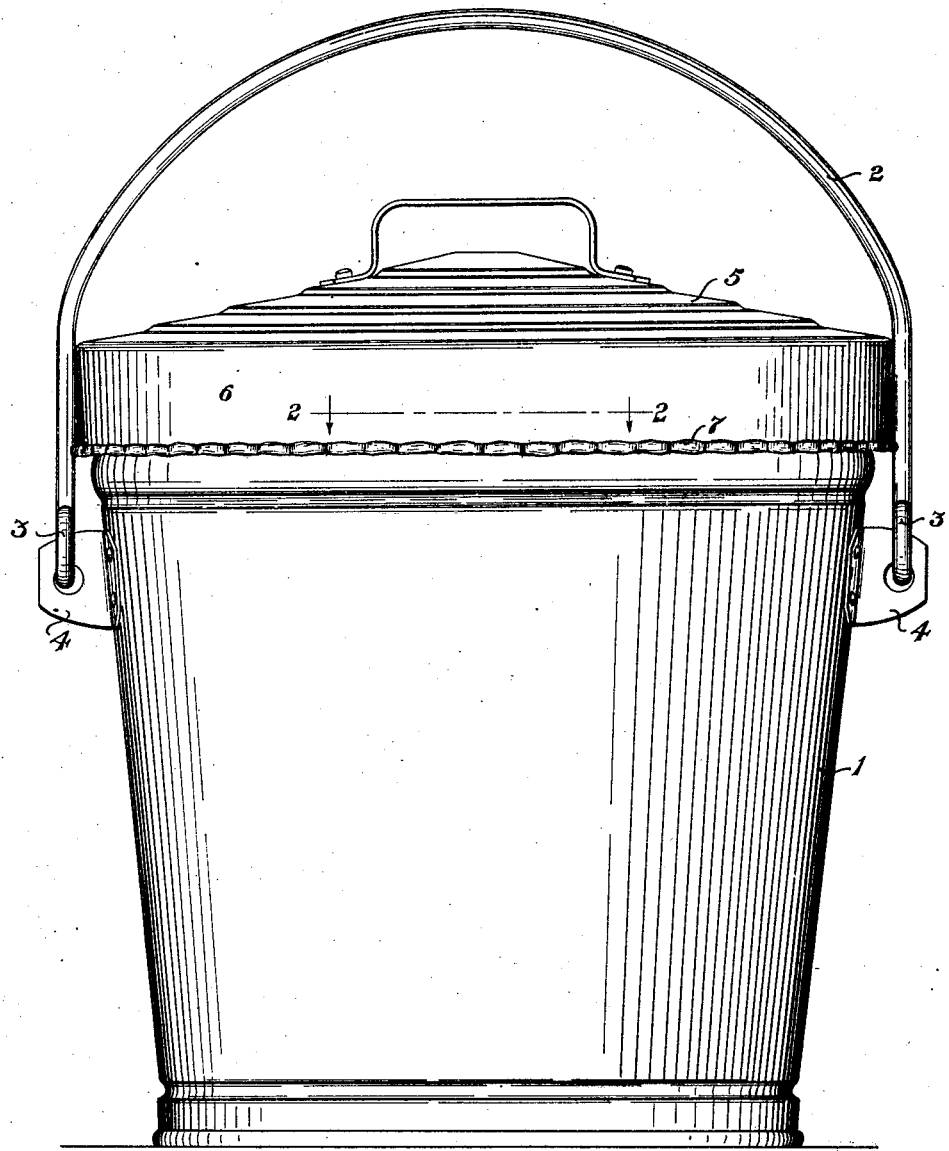
Figure 2:
Figure 3:
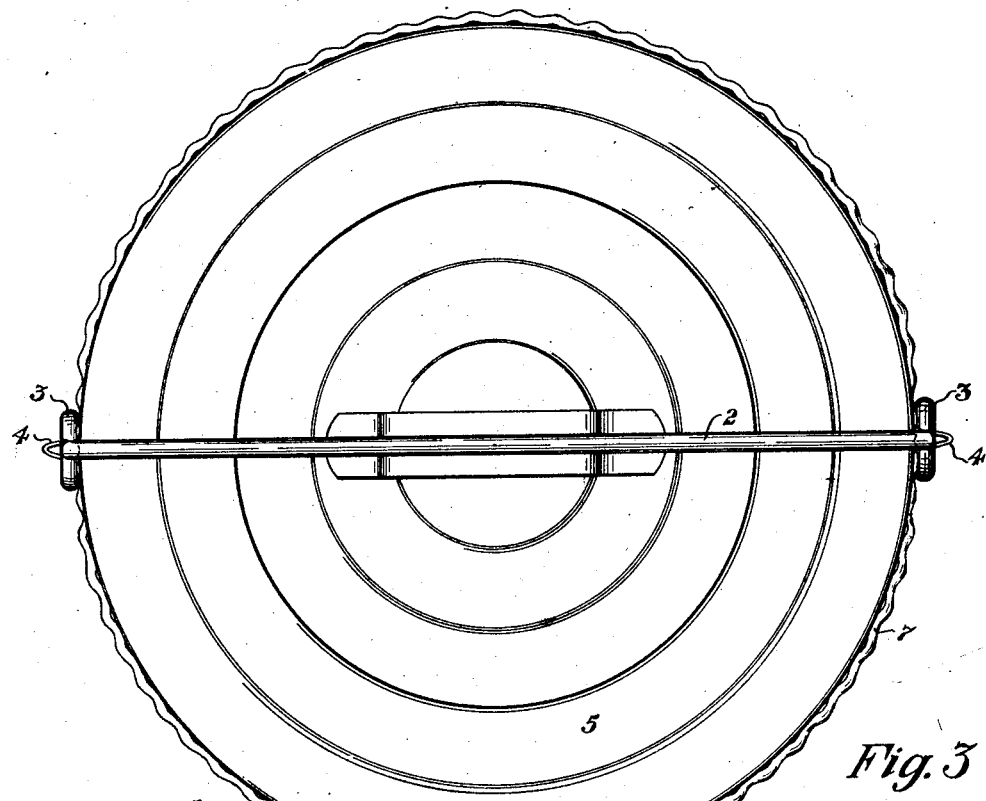
Figure 5:
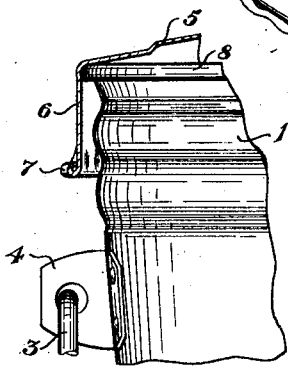
Figure 6:
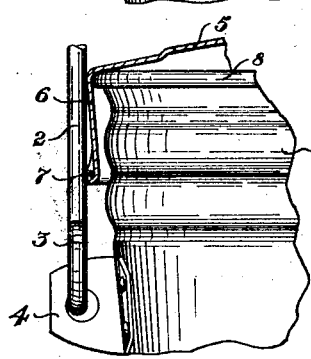
Figure 4:
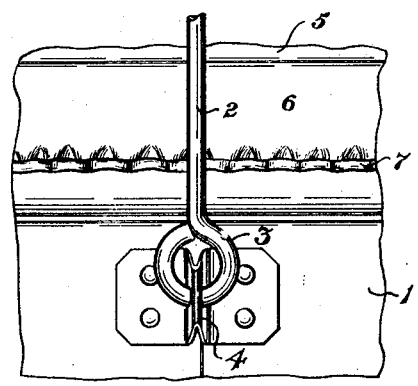

Figure 1 is a side elevation of a garbage pail or the like, provided with a cover having the improved locking bead thereon, showing the handle bail in position to lock the cover upon the pail;

Fig. 2, a fragmentary sectional view through a portion of the cover and pail, taken substantially on the line 2—2, Fig. 1;

Fig. 3, a top plan view of the pail and cover in the position shown in Fig. 1;

Fig. 4, a fragmentary side elevation of a portion of the pail and cover, showing the handle bail in locking position with reference to the cover;

Fig. 5, a fragmentary elevation of a portion of the pail, showing the cover in section and the handle bail in lowered position; and Fig. 6, a similar view showing the handle bail in raised or locking position.

Similar numerals refer to similar parts throughout the several figures of the drawings.

The pail or can 1 may be of any usual and well known construction, and is provided with the usual handle bail 2, pivotally connected to the pail as by the eyes 3 and ears 4, located at diametrically opposite points upon the upper portion of the pail.

The cover 5 may be of usual construction provided with the depending peripheral flange 6 terminating at its lower edge in a bead 7, which may be continuously corrugated, as shown in the drawings.

The depending flange 6 may be arranged to fit, at its upper end, upon the peripheral lip or bead 8 of the pail, the lower portion of the flange being preferably spaced from the body of the pail, as best shown in Figs. 2, 5 and 6.

The handle bail 2 may be of a width substantially equal to the diameter of the cover, whereby when the bail is raised to substantially vertical position, as best shown in Figs. 1 and 6, the end portions of the bail will frictionally engage the corrugated bead at the lower edge of the cover flange, flexing the same, as shown in Fig. 6, and placing the bail and cover flange under tension.

Each side portion of the bail will thus be frictionally engaged with one of the notches or depressions in the corrugated bead 7, holding the bail in upright position and locking the cover upon the pail, while the bail is held in this position.

It will be seen, by an inspection of Fig. 1, that the cover cannot be raised from engagement with the pail while the bail is in this position, as owing to the shape of the bail, little, if any, upward movement of the cover, relative thereto, is possible.

The invention illustrated herein is an improvement over my copending applications Serial No. 198,558, filed June 13, 1927, and Serial No. 238,094, filed December 6, 1927.

In both of the above cases, it should be noted that the locking cover depends largely upon the resilience of the corrugated flange of the cover or the corrugated strips attached to the cover.

In the present case a simpler and cheaper construction is provided in which the cover may be made in the usual and ordinary manner, and the usual bead upon the cover flange may be easily and cheaply corrugated. This construction permits the inherent flexibility of the cover flange itself to provide the tension required for frictionally engaging the handle bail.

I claim:—

1. In combination with a pail and the like having a handle bail, a cover for the pail provided with a depending peripheral resilient flange and a corrugated bead formed at the lower edge of the flange for frictional engagement with the bail.

2. In combination with a pail and the like having a handle bail, a cover for the pail provided with a depending peripheral resilient flange and a corrugated bead formed at the lower edge of the flange for frictional engagement with the bail, the lower portion of the flange being spaced from the pail.

In testimony that I claim the above, I have hereunto subscribed my name.

VIRGIL P. WENDLE.